United States Patent
Dolganow et al.

(10) Patent No.: US 8,204,915 B2
(45) Date of Patent: Jun. 19, 2012

(54) APPARATUS AND METHOD FOR GENERATING A DATABASE THAT MAPS METADATA TO P2P CONTENT

(75) Inventors: Andrew Dolganow, Ottawa (CA); Steve Morin, Ottawa (CA); David Maxwell, Ottawa (CA)

(73) Assignee: Alcatel Lucent, Paris (FR)

( * ) Notice: Subject to any disclaimer, the term of this patent is extended or adjusted under 35 U.S.C. 154(b) by 668 days.

(21) Appl. No.: 12/371,140

(22) Filed: Feb. 13, 2009

(65) Prior Publication Data

US 2010/0211608 A1    Aug. 19, 2010

(51) Int. Cl.
*G06F 7/00*    (2006.01)
*G06F 17/30*    (2006.01)

(52) U.S. Cl. ........................................ 707/803; 707/952

(58) Field of Classification Search ........................ None
See application file for complete search history.

(56) References Cited

U.S. PATENT DOCUMENTS

| | | | |
|---|---|---|---|
| 2008/0133706 A1* | 6/2008 | Chavez et al. | 709/218 |
| 2010/0008509 A1* | 1/2010 | Matsushita et al. | 380/279 |
| 2010/0138382 A1* | 6/2010 | Nagoya et al. | 707/609 |

OTHER PUBLICATIONS

Sadafal, "Measurement and Analysis of BitTorrent," The Office of Graduate Studies of Texas A&M University, Aug. 2008.*
Dias, "Corporate portals: a literature review of a new concept in Information Management," International Journal of Information Management, 2001.*
Kalker et al., "Music2Share—Copyright—Compliant Music Sharing in P2P Systems," Proceedings of the IEEE, vol. 92, No. 6, Jun. 2004.*

* cited by examiner

*Primary Examiner* — Pierre Vital
*Assistant Examiner* — Rachel J Lee
(74) *Attorney, Agent, or Firm* — Kramer & Amado, P.C.

(57) ABSTRACT

Various exemplary embodiments disclose an apparatus and method for generating a database that maps metadata to peer-to-peer (P2P) content and, more particularly, to a database that an Internet Service Provider (ISP) can build to correlate metadata with P2P traffic. The database may collect metadata having a key that uniquely corresponds to particular P2P content. An ISP may use the database to identify malware in P2P files and tag P2P traffic that seeks to exchange material in violation of applicable copyright laws.

20 Claims, 4 Drawing Sheets

| Key | Description | Action |
|---|---|---|
| 86753096345789250624 | "Music Warez," Pirated | Notify NMS |
| 1138691058675309 | "Glaurung," Worm | Drop Packets |
| ... | ... | ... |

300

| | 310 | 320 | 330 |
|---|---|---|---|
| | Key | Description | Action |
| 340 | 86753096345789250624 | "Music Warez," Pirated | Notify NMS |
| 350 | 1138691058675309 | "Glaurung," Worm | Drop Packets |
| 360 | ... | ... | ... |

FIG. 3

APPARATUS AND METHOD FOR GENERATING A DATABASE THAT MAPS METADATA TO P2P CONTENT

TECHNICAL FIELD

Various exemplary embodiments relate generally to an apparatus and method for generating a database that maps metadata to peer-to-peer (P2P) content and, more particularly, to generating a database that an Internet Service Provider (ISP) or other entity can access to manage P2P traffic.

BACKGROUND

Peer-to-peer (P2P) technology supports the sharing of large amounts of content among a potentially huge number of users. Historically, networks with P2P technology have distributed information without a central server or a central router. Individual nodes in a P2P network, known as peers, have equal status and can function as both clients and servers. That is, peers can both upload files to the P2P network and download files from the P2P network. Various types of decentralized P2P networks have developed during the past decade.

While some P2P networks, such as Napster™, were centralized, others did not have a main server that directed traffic between users on the P2P network. Freenet, an open source version of a P2P system described by Ian Clarke in 1999, only requires a new node connecting to the P2P network to know the location of at least one existing node. The Gnutella file sharing network, developed by Justin Frankel and Tom Pepper of Nullsoft in 2000, links a large number of user nodes by having an initial node perform an operating known as "bootstrapping," thereby making a connection to at least one other node.

The FastTrack file sharing protocol, introduced by the Dutch company Consumer Empowerment in 2001, features the use of supernodes to improve scalability. Many P2P programs, such as Kazaa, Grokster, and Morpheus became FastTrack clients. However, extensive use of FastTrack soon revealed that it had some drawbacks, such as allowing massive corruption of a file to go unnoticed. Thus, other protocols became more popular as the use of FastTrack declined.

The BitTorrent file sharing protocol, developed by Bram Cohen in 2001, operates by creating "torrent" files when a user first uploads a large file onto a P2P network that uses the BitTorrent protocol. Because the original file may be split into many pieces and scattered across the network, each torrent file contains metadata that may allow a peer to contact a tracker computer regarding desired content. The tracker computer, performing a bootstrap operation, uses the torrent file to locate the specified content from the various locations where it may be stored and permits the peer to reassemble the scattered pieces into the original file. Some networks using the BitTorrent protocol may be trackerless, using means other than a tracker computer to bootstrap connections between users.

There are currently a number of problems with P2P protocols. First, P2P protocols for decentralized systems may provide no way to verify that the user is downloading desired content. For BitTorrent networks, torrent files may not be indexed. As a result, the peer cannot be certain that the torrent file will actually result in the tracker retrieving the desired content. Instead of obtaining the requested file, the peer could receive malware or even a computer virus.

Second, P2P protocols may be used to exchange copyrighted material without authorization. Such exchanges may also devour any and all available bandwidth on a network, harming the online Quality of Experience of other users.

Because of the large amount of bandwidth consumed by P2P traffic that violates copyright laws, some Internet Service Providers (ISPs) have treated all P2P traffic as suspect and have sought to block it. However, such treatment is unfair to legitimate P2P transfers.

The problems described above could be reduced by providing a database that distinguishes between legitimate and illegitimate P2P traffic. Such a database would allow an ISP to perform appropriate management actions on illegitimate P2P traffic, while allowing legitimate P2P traffic to proceed without such management actions. Current implementations fail to enable such an approach, as they provide no way to efficiently distinguish between legitimate and illegitimate content.

For the foregoing reasons and for further reasons that will be apparent to those of skill in the art upon reading and understanding this specification, there is a need for a system that comprehensively collects and classifies P2P content in a database. Furthermore, there is a need to map unique keys within metadata to respective P2P files. Additionally, there is a need to more efficiently identify malware and online piracy by using a database to survey P2P content.

SUMMARY

In light of the present need for a database that maps metadata to a description of the P2P content, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a computer-implemented method of generating a database to map metadata to peer-to-peer (P2P) content. The method may obtain the metadata from at least one remote location. The metadata may comprise a key that uniquely identifies a P2P content item. The method may then establish a connection with at least one remote peer that stores at least a portion of the P2P content item. Using the remote peer, the method may download the stored portion of the P2P content item to a database, wherein the database is accessible to a network element that processes P2P traffic. The method may then analyze at least a portion of the downloaded P2P content item to determine a description of the P2P content item. The method may conclude by updating the database with a mapping between the description of the P2P content item and the key.

Various exemplary embodiments relate to an apparatus that may build a database for mapping metadata to peer-to-peer (P2P) content. This apparatus may comprise at least one client crawler that collects metadata from at least one remote location and connects to at least one remote peer to obtain at least a portion of a P2P content item. The content acquisition and analysis system may use the collected samples of metadata and the obtained portion of the P2P content item to identify the content in the P2P content item. The content acquisition and analysis system may further comprise a P2P collector module that may be the at least one client crawler or, alternatively, include the at least one client crawler. The P2P collector module may receive both the metadata and at least a portion of the P2P content item. A metadata key database module may extract a key uniquely identifying the P2P content item from the metadata received by the P2P collector module. A content database module may store the received portion of the P2P content item. A content identifier module may identify the stored portion of the P2P content item in the content database module.

It should be apparent that various exemplary embodiments enable content-specific classification of P2P files. In particular, by building a database that maps P2P content keys to corresponding management functions, an ISP will be able to manage illegitimate P2P traffic while permitting legitimate P2P traffic to flow without any management. Thus, various exemplary embodiments generate a database that may be accessed to enable an ISP or other entity to preserve bandwidth, prevent copyright infringement, and block malware without disrupting legitimate P2P traffic.

BRIEF DESCRIPTION OF THE DRAWINGS

In order to better understand the various exemplary embodiments, reference is made to the accompanying drawings, wherein:

FIG. 3 depicts an exemplary data arrangement for storage in the exemplary content acquisition and analysis system of FIG. 2.

DETAILED DESCRIPTION

Figure 1:
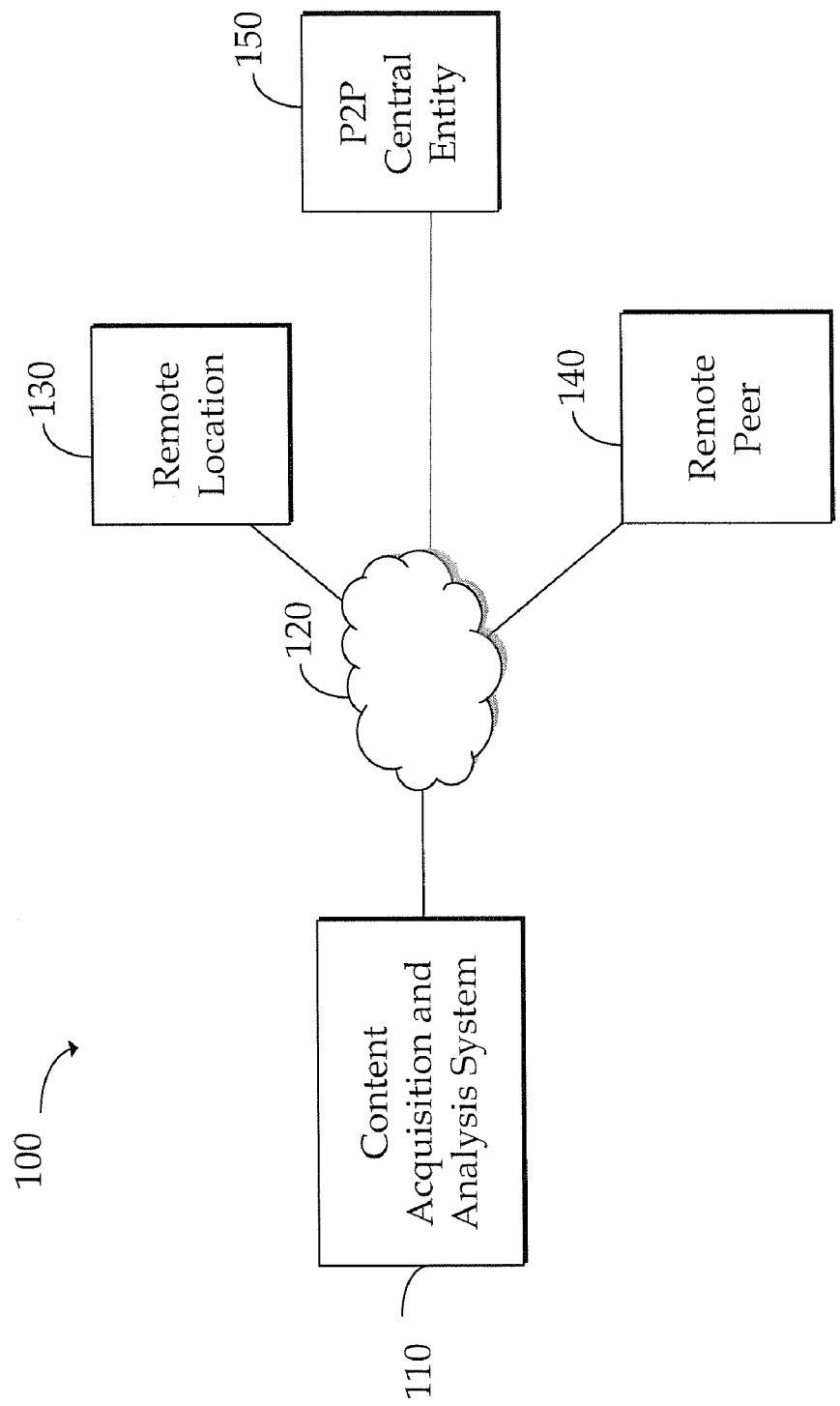
FIG. 1 depicts an exemplary network that generates a database that maps metadata to peer-to-peer (P2P) content.

Referring now to the drawings, in which like numerals refer to like components or steps, there are disclosed broad aspects of various exemplary embodiments.

FIG. 1 depicts an exemplary network 100 that generates a database mapping metadata to peer-to-peer (P2P) content. As shown in FIG. 1, network 100 comprises a content acquisition and analysis system 110, an Internet connection 120, at least one remote location 130, and at least one remote peer 140, and optionally a P2P central entity 150. These exemplary elements are described in further detail below.

Content acquisition and analysis system 110 may be located in a computer system of an Internet Service Provider (ISP) or another entity that manages a computer network. System 110 may be accessible to a system operated by an ISP or similar entity to permit management of P2P traffic based on content identified within such P2P traffic by means of the presence of unique keys. Such systems and techniques for use in conjunction with those systems are described in further detail in the following co-pending applications, each incorporated by reference herein: application Ser. No. 12/371,079, "Optimized Mirror for P2P Identification" to Dolganow et al.; application Ser. No. 12/371,197, "Peer-to-Peer Traffic Management Based on Key Presence in Peer-to-Peer Data Transfers" to Dolganow et al.; application Ser. No. 12/371,234, "Peer-to-Peer Traffic Management Based on Key Presence in Peer-to-Peer Control Transfers" to Dolganow et al.; and application Ser. No. 12/371,261, "Inline Key-Based Peer-to-Peer Processing" to Dolganow et al.

System 110 may comprise at least one client crawler. Such a crawler may perform a scraping function, collecting data from remote websites and computers in an appropriate manner, as will be evident to those having ordinary skill in the art. An ISP may use one or more client crawlers to obtain information indicating the location of P2P content for subsequent storage and analysis in system 110. The one or more client crawlers may randomly access online locations or selectively target particular locations. In either case, the client crawlers will initially collect keys that uniquely correspond to particular P2P content items.

As an example, a client crawler may screen scrape to obtain .torrent files, metadata that describe P2P files stored elsewhere in a BitTorrent network. Such automated screen scraping may imitate the actions of a user typing on a terminal to acquire a .torrent file. The crawler may use a capture program to "look" at the screen and pull data off of it corresponding to a key in the torrent file.

Keys may be values within metadata that identify corresponding P2P content. In general, metadata may be data that provide information about or documentation of other data managed within an environment. In a P2P environment, keys may be used to determine the location of particular P2P content. The length of such keys may vary depending upon the P2P protocol. For the BitTorrent protocol, keys may be found in a torrent file. The keys found within this .torrent file may be twenty bytes in length and may be referred to as "info_hash."

Regardless of the particular protocol, the keys function as indices, allowing the system 110 to retrieve a unique piece of P2P content from a remote location. For example, if the system 110 obtains a .torrent file, the system 110 may extract the info_hash key and contact a tracker computer (P2P central entity 150) with a request that includes the key. The tracker computer 150 may respond to the request by sending a list of peers (remote peer 140) that contain at least one fragment of the desired P2P file. To acquire the P2P file, the system 110 may contact the peers 140 and request the pieces of the P2P file repetitively, downloading the pieces until a sufficient section of the original P2P file is assembled on the system 110 to permit subsequent identification of the content of the original P2P file. The sufficient section of the original P2P file may be a full copy of the original P2P file or only a substantial part of the original P2P file. In some embodiments, system 110 may contact remote peers 140 directly without a need to use P2P central entity 150.

Internet connection 120 is coupled to system 110. Internet connection 120 may include a plurality of computer systems that are coupled to each other within network 100. As described below, Internet connection 120 may allow system 110 to exchange data with remote location(s) 130, remote peer(s) 140, and optionally at least one P2P central entity 150.

Content acquisition and analysis system 110 may use Internet connection 120 to access metadata from the at least one remote location 130. The metadata may comprise a key that uniquely identifies a P2P content item. While this P2P content item might also be found in the same remote location 130, the metadata may also act as pointers, directing system 110 to another location that actually stores the P2P content item.

When the P2P content item corresponding to the key is not found in location 130, system 110 may use Internet connection 120 to optionally access at least one P2P central entity 150 for the list of remote peers 140 containing the location of the P2P content file. In some embodiments, system 110 may access one or more P2P central entities 150 to create a list of peers 140 that contain the desired content. In other embodiments, metadata may contain the list of all or initial peers 140 to contact.

At least one remote peer 140 may store at least a portion of the P2P content item or the entire P2P content item. Peer 140 may store malware or other destructive content that does not correspond to the advertised P2P content. Peer 140 may be unaware of this fraudulent content, as an unscrupulous person may have seeded the P2P network with such content under false pretenses.

If the entire P2P content item is found in peer 140, system 110 may simply download P2P content item for storage and subsequent identification. Alternatively, if only a portion of the P2P content item is found in peer 140, system 110 may only download that portion. Content acquisition and analysis system 110 may be able to identify the content of the entire P2P item based upon a downloaded fragment if that fragment is a sufficient section of the P2P item, as described above.

If system 110 is unable to identify the content of the original P2P item after downloading a fragment from peer 140, system 110 may access a plurality of remote peers 140, each peer 140 possibly having a fragment of an original P2P content item. By repeatedly downloading fragments of the original P2P content item that correspond to the unique key in the metadata, system 110 may gradually reassemble the original P2P content item. This process may continue until the entire P2P content item is downloaded or a sufficient section of the P2P content item is acquired to permit accurate identification.

As mentioned above, peer 140 may possess deceptive content, sending a computer virus instead of the content purported to correspond to the key. The peer may be unaware of the destructive nature of this content as a malicious user may have originally seeded the P2P network with the malware under a false name, such as the title of a movie or a song. Alternatively, a peer 140 may transmit less destructive, but still unwanted, content such as spyware. It may not be possible to identify such fraudulent content from its name, so the ISP or other entity managing the network may need to acquire a complete copy of the P2P content from peer 140 in order to verify the actual identity of the P2P content.

Content acquisition and analysis system 110 may analyze the downloaded P2P content to identify it and then store a mapping of the key to the P2P content. This mapping may describe the actual nature of the content, as opposed to its purported content which may be faked by an unreliable peer 140. Analysis and identification of P2P content, as will be apparent to those having ordinary skill in the art, may use techniques such as virus detection, malware detection, fingerprinting, watermarking, and other appropriate methods.

Figure 2:
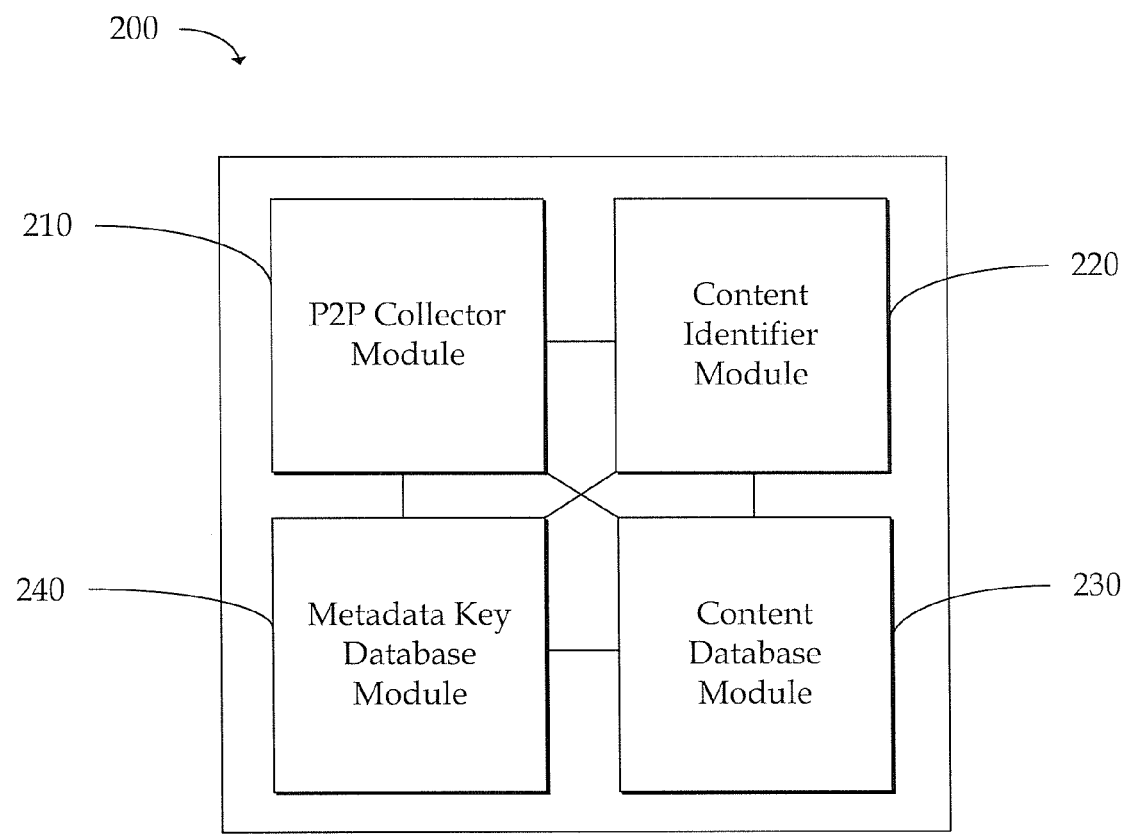
FIG. 2 depicts an exemplary content acquisition and analysis system for use in the network of FIG. 1.

FIG. 2 depicts an exemplary content acquisition and analysis system 200 for use in the network 100 of FIG. 1. As shown in FIG. 2, content acquisition and analysis system 200, which may correspond to system 110 of FIG. 1, may comprise a P2P collector module 210, a content identifier module 220, a content database module 230, and a metadata key database module 240. Each of these modules may be implemented by means of suitable hardware. These exemplary elements are described in detail below.

P2P collector module 210 may collect metadata from at least one remote location. By using a key within the metadata, P2P collector module 210 may also determine a location of data that correspond to the key and then acquire at least a portion of the P2P content item that corresponds to the key. One or more client crawlers in content acquisition and analysis system 110, as previously described in FIG. 1, may provide both metadata and corresponding P2P content items to P2P collector module 210. P2P collector module 210 may be a client crawler or include a client crawler. As described in further detail below, P2P collector module 210 may forward downloaded P2P content to content identifier module 220 for identification and to content database module 230 for storage. Identification may occur before storage, or system 200 may identify stored copies of P2P files.

As will be apparent to those having ordinary skill in the art, P2P collector module 210 may acquire P2P content using various protocols. For example, P2P collector module 210 may use subscriptions to tracker computers 150 that correspond to certain forms of the BitTorrent protocol. Alternatively, P2P collector module 210 may function as a leaf node, acquiring P2P content from ultrapeers that use Gnutella. In either case, P2P collector module 210 will first acquire a key from downloaded metadata and subsequently use that key to determine locations of the P2P data and retrieve at least a portion of a P2P content item that corresponds uniquely to the key.

After receiving P2P content from P2P collector module 210, content identifier module 220 may analyze the received content in an attempt to verify the actual identity of the underlying content. While content identifier module 220 may use complete downloads of entire P2P content items, it may also be able to identify content based upon partial downloads. Content identifier module 220 may perform this identification by using fingerprinting, watermarking, or by other methods that will be apparent to those having ordinary skill in the art. As an example, content identifier module 220 may identify P2P content with malware or pirated material. As another example, content identifier module 220 may analyze a music file to determine the title and artist.

As will be apparent to those having ordinary skill in the art, multiple techniques may be used to identify unwanted P2P content or to aid users by ensuring that downloaded P2P files actually contain the material that they are supposed to store. An ISP could promote acceptance of this technique by offering it as a free service to users. In addition to checking for malware or pirated material, a specially programmed computer could compare downloaded P2P content with a list of known adware programs.

After content identifier module 220 determines the nature of the P2P content, content database module 230 may store copies of the P2P content files or sufficient sections of those files. Alternatively, content database module 230 may first store a copy and then forward that copy to content identifier module 220. In either case, such storage may be temporary, lasting only long enough for the P2P content to be logged as an entry in system 200. Alternatively, content database module 230 could retain entire files for a significant period of time. Such retention could be important when performing a system security operation on malware or when tracing piracy of copyrighted material. In such cases, the ISP or other entity managing the networks may need to transmit a full copy of the downloaded P2P content to another entity at a remote location for comprehensive analysis.

Using data acquired from P2P collector module 210, metadata key database module 240 may record metadata that comprise a key uniquely identifying a P2P content item. When dealing with P2P content items that use the BitTorrent protocol, metadata key database module 240 may store a complete database of all info_hash keys found within the torrent files. Alternatively, metadata key database module 240 may only cache info_hash keys from torrent files that correspond to P2P content of interest, such as malware or unauthorized copies of copyrighted music.

Metadata key database module 240 may store keys that correspond to particular categories of content, such as audio and video. To permit subsequent recognition of P2P content items, metadata key database module 240 may optionally record the name of particular P2P content, correlating that name with specific info_hash values. However, this step may be optional as the key should uniquely identify the particular P2P content. Metadata key database module 240 may also build up a list of possible actions, mapping the recorded key to an appropriate management action, as will be described further with reference to FIG. 3.

FIG. 3 depicts an exemplary data arrangement 300 for storage in the exemplary content acquisition and analysis system 200 of FIG. 2. As shown in FIG. 3, table 300 comprises a key column 310, a description column 320, an action column 330, a first row 340, a second row 350, and at least a third row 360. These exemplary elements are described in further detail below.

Key column 310 may store metadata that comprise a key uniquely identifying a P2P content item. As an example, this key may comprise info_hash values for a dot torrent file used to acquire P2P content items from a remote location in a BitTorrent network. For the BitTorrent protocol, as an example, each key may be a unique 20-byte string that was binary-encoded ("bencoded") with a Secure Hash Algorithm (SHA).

Description column 320 may describe the P2P content that corresponds to the unique key recorded in key column 310. Description column 320 may provide information regarding the P2P content, identifying, for example, whether it is malware or pirated material. Description column 320 may optionally list the name of the P2P content, but key column 310 should be sufficient to uniquely identify the P2P content.

While description column 320 may have a single entry that corresponds to a unique piece of P2P content, column 320 could be expanded to include other identifiers. For example, a unique identifier for a particular peer may be necessary to allow a message to be routed from that peer into a P2P network. If an ISP or other entity discovers that a particular peer stores fraudulent content, such as malware or adware, the ISP might record the unique identifier of that peer as well as the identifier of the malicious P2P content. Recording the peer's unique identifier could be also useful in the case of a peer distributing large amounts of copyright infringing material, allowing the ISP or management entity to report the peer to the appropriate authorities.

Action column 330 may provide a recommended action for the ISP regarding P2P traffic that corresponds to particular metadata in key column 310. The type of P2P traffic, which may be listed in description column 320, may also correlate to the suggested action in action column 330. As described below, possible ISP actions may include notifying a Network Management System (NMS), dropping packets, traffic shaping, and other suitable measures.

In egregious cases of copyright infringement, the ISP could use action column 330 to establish a graduated series of responses for each violation. For example, action column 330 could include the following sequence: drop packets for a small number of violations, suspend service for a larger number of violations, and terminate all access to the ISP once the number of violations exceeded a predetermined threshold. As will be evident to one having ordinary skill in the art, such responses in action column 330 may be proportional to the monetary impact of the particular act of piracy.

First row 340 is an exemplary entry for a P2P content item. In this example, the value in the key column 310, "86753096345789250624," represents a twenty-byte binary identifier used as an info_hash file in a BitTorrent network. The description column 320 displays the name of the P2P content corresponding to the info_hash file, "Music Warez" and indicates its type, "Pirated." In the action column 330, table 300 recommends the appropriate action for P2P traffic identified to match the value in key column 310: "Notify NMS."

In this case, the ISP has determined that "Music Warez" is likely to contain material in violation of applicable copyright laws and has decided that notifying the Network Management System (NMS) is an appropriate response. As will be apparent to those of ordinary skill in the art, other actions could be performed, such as notifying appropriate authorities for enforcement of the applicable copyrights.

Second row 350 is another exemplary entry for a P2P content item. For this entry, key column 310 displays a sixteen-byte globally unique identifier (GUID), "1138691058675309," a key used for file sharing in a Gnutella network. Description column 320 lists the name of the P2P file corresponding to the GUID, "Glaurung," and, in this case, also describes its type, "Worm." Because the ISP has discovered that this P2P file is a dangerous worm, a self-replicating computer program that may cause serious harm to the network, action column 330 suggests "Drop Packets." Other appropriate measures to prevent and eliminate the spread of this worm and similar malware may be used, as will be apparent to those of ordinary skill in the art.

In this illustration, exemplary third row 360 is still blank, having entries of " . . . " in key column 310, description column 320, and action column 330. Moreover, table 300 may include an arbitrary number of rows, wherein the process of building system 200, as described in reference to FIG. 4 below, gradually fills the rows. Thus, row 360 may represent a plurality of rows.

Figure 4:
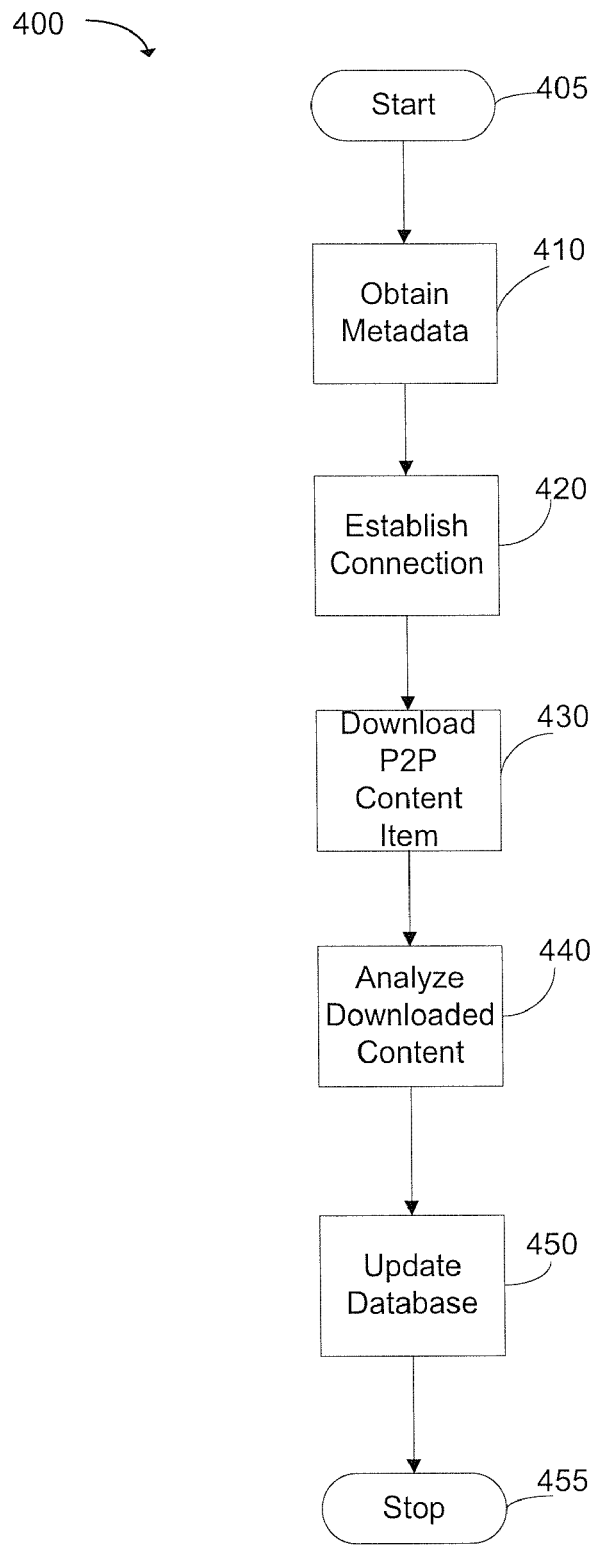
FIG. 4 depicts an exemplary method of generating a database that maps metadata to peer-to-peer (P2P) content.

FIG. 4 depicts an exemplary method 400 of generating a database that maps metadata to peer-to-peer (P2P) content. Method 400 may be executed on a specially-programmed computer, such as, for example, content acquisition and analysis system 110, by an ISP or management entity when obtaining keys that correspond uniquely to particular P2P content. As shown in FIG. 4, method 400 starts in step 405 and ends in step 455. Intervening steps include obtaining metadata 410, establishing a connection 420, downloading content 430, analyzing the downloaded content 440, and updating a database 450. These exemplary elements are described in further detail below.

After starting in step 405, method 400 proceeds to step 410. Step 410 may involve an Internet Service Provider (ISP) collecting metadata that include information related to P2P content, such as a key that uniquely identifies a specific piece of P2P content. The ISP or other management entity could search for the key based on content of interest, such as movies released by a single studio or songs by a particular artist. However, as will be apparent to those having ordinary skill in the art, an ISP or management entity may choose to download or otherwise obtain the key containing information related to any arbitrary type of P2P content.

The ISP may use a client crawler in system 110, as depicted in FIG. 1, to obtain P2P content in step 410. Alternatively, the ISP may use a plurality of client crawlers in system 110. In either case, the ISP may employ at least one crawler that may have the ability to search remote locations 130, remote peers 140, and monitor user traffic for P2P uploads and downloads. Thus, the at least one crawler may mimic or otherwise emulate the behavior of a user searching for P2P content on a network.

In step 420, method 400 may establish a connection with at least one remote peer 140, as shown in FIG. 1, the at least one remote peer 140 storing at least a portion of the P2P content item. For a BitTorrent network, a tracker computer 150 may indicate the location of a plurality of peers 140 that store P2P content. For a Gnutella network, a plurality of ultrapeer nodes may indicate the leaf node locations of a plurality of peers 140 that store P2P content. As will be apparent to those having ordinary skill in the art, the nature of the at least one remote peer 140 may vary depending upon the applicable P2P network.

Regardless of the network, step 420 may attempt to mimic or emulate the behavior of a typical user of a P2P network. When a peer places a file on a P2P network, a unique key for that file will serve as an index. A user searching for the original file may acquire a copy of the key, but may not know whether the key really corresponds to its ostensible P2P content until that P2P content is downloaded.

In step 430, method 400 may download P2P content items from the remote peers 140 to a system 110. Step 430 may involve, for example, the at least one remote peer 140, as shown in FIG. 1, transmitting the P2P content item to system 110. Alternatively, step 430 may only download a sufficient section of a P2P content item, provided that the sufficient section contains enough data to permit identification of the type of P2P content in the entire file. For example, watermarking and fingerprinting may be used to determine the actual identity of the content.

For a BitTorrent network, any manipulation of a file that modifies its contents, such as audio compression, may change the info_hash values. Thus, a first torrent may include the original file, while a second torrent may store a compressed version of the same file. Consequently, the ISP may build the system 110 in step 430 so that it may correlate multiple info_hash values to different P2P files that have similar names. The names may not be important, as the key may uniquely correspond to P2P content of interest.

In step 440, method 400 may analyze the downloaded content. For example, method 400 could use fingerprinting, watermarking, and similar techniques with system 110 to identify content in the downloaded files. Step 440 may search for particular categories of content based upon known problems on the network. For example, step 440 may search the downloaded content for signatures of malware, viruses, and worms. Alternatively, step 440 may compare the downloaded file with watermarks or fingerprints, thereby enabling system 110 to detect copyright infringement in subsequent P2P traffic. Other categories may be used, as will be apparent to those having ordinary skill in the art.

For certain P2P networks, such as BitTorrent networks, it may be difficult to use watermarking or fingerprinting techniques for Digital Rights Management (DRM). This problem may occur when P2P file sharing splits an original file into hundreds, or even thousands, of tiny fragments. However, an ISP may defeat this problem by reassembling the fragments of the scattered file in the system 110, thereby rebuilding either a copy of the original P2P file or at least a sufficient section of the original P2P file to permit accurate identification of that file. Accordingly, the system 110 can confirm a DRM violation by recreating the content that was seeded to the P2P network. The ISP may regularly populate the system 110 with malware, virus, and worm signatures, so that these signatures may be used in identifying the content.

In step 450, method 400 may update the system 110 with metadata corresponding to particular P2P content items. For example, step 450 may involve reporting the identified content to a third party. The ISP could report its discovery of malware, viruses, or worms to a company involved in intrusion prevention and security risk management. In the case of pirated material, the ISP could report the offending packets to proper authorities for copyright enforcement.

Step 450 may update the database repeatedly by performing a search for keys corresponding to a plurality of P2P content items on a predetermined schedule. For example, an ISP or management entity may perform a weekly survey of P2P content by collecting keys that uniquely correspond to particular P2P content. Frequent updates of the database may occur when keys are found that correspond to previously unknown content or particularly dangerous content.

According to the preceding disclosure, an ISP or comparable management entity may construct a database that maps unique keys to corresponding P2P content and appropriate management functions. Such a database may enable management of dishonest P2P traffic, such as malware and adware, without interfering with legitimate P2P traffic. The database may aid users by verifying whether P2P files are genuine, actually storing the content that they purport to provide. The database may aid copyright enforcement, identifying keys that correspond to pirated material.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memories (ROMs), random-access memories (RAMs), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A computer-implemented method of generating a database to map metadata to peer-to-peer (P2P) content in a content acquisition and analysis system, the method comprising:

obtaining, in the content acquisition and analysis system, the metadata from at least one remote location, wherein the metadata comprise a key that uniquely identifies a P2P content item;

establishing a connection with at least one remote peer, the at least one remote peer storing at least a portion of the P2P content item;

downloading at least the stored portion of the P2P content item from the at least one remote peer to a database on a non-transitory medium, wherein the database is accessible to a network element that processes P2P traffic;

analyzing the downloaded P2P content item to extract a description of the P2P content item;

updating the database to store a mapping between the description of the P2P content item and the key; and defining a graduated series of responses based upon the updated database, wherein different responses of the graduated series of responses correspond to different numbers of detected violations in the updated database.

2. The method of claim 1, further comprising:

sending a request for peer location information to a tracker computer, the request for peer location information including the key;

in response to the request, receiving the peer location information from the tracker computer, the peer location information corresponding to the at least one remote peer; and using the received peer location information to establish at least one connection with the at least one remote peer to download at least the stored portion of the P2P content item.

3. The method of claim 1, further comprising:

storing a plurality of info_hash values in the database, the plurality of info_hash values respectively corresponding to a plurality of keys that uniquely identify a corresponding plurality of P2P content items.

4. The method of claim 1, further comprising:

after analyzing the downloaded portion, identifying a title of the P2P content item.

5. The method of claim 1, further comprising:

linking the mapping between the description of the P2P content item and the key to at least one recommended action; and using, by an Internet Service Provider (ISP), the at least one recommended action upon detection of a subsequent P2P transfer with an identical key.

6. The method of claim 1, further comprising:

using the mapping between the description of the P2P content item and the key to verify whether the P2P content item contains malware.

7. The method of claim 1, further comprising:

repeatedly downloading a plurality of stored portions of the P2P content item until a sufficient section of the P2P content item is assembled to permit accurate identification of the P2P content item; and analyzing the sufficient section of the P2P content item to determine a description of the P2P content item.

8. The method of claim 7, wherein the step of analyzing comprises;

performing at least one of watermarking, fingerprinting, malware detection, and virus detection on the sufficient section of the P2P content item.

9. The method of claim 1, further comprising:

using at least one client crawler to obtain the metadata from the at least one remote location and the portion of the P2P content item from the at least one remote peer.

10. The method of claim 1, further comprising:

updating the content acquisition and analysis system repeatedly by performing a search for keys corresponding to a plurality of P2P content items on a predetermined schedule;

using new keys obtained during the search to download new P2P content items; and analyzing the new P2P content items to determine descriptions of the new P2P content items.

11. An apparatus that builds a content acquisition and analysis system that maps metadata to peer-to-peer (P2P) content, the apparatus comprising:

a content acquisition and analysis system that uses samples of metadata to identify the content in a P2P content item comprising:

a P2P collector module, comprising a non-transitory medium, including at least one client crawler, that collects the samples of metadata from at least one remote location and connects to at least one remote peer to download at least a portion of the P2P content item, a metadata key database module, comprising a non-transitory medium, that extracts a key uniquely identifying the P2P content item from the metadata the downloaded by the P2P collector module, a content database module, comprising a non-transitory medium, that stores the downloaded portion of the P2P content item, wherein the content database module defines a graduated series of responses and different responses of the graduated series of responses correspond to different numbers of detected violations in the content acquisition and analysis system, and a content identifier module, comprising a non-transitory medium, that uses the downloaded portion of the P2P content item stored in the content database module to identify the P2P content item.

12. The apparatus of claim 11, wherein the P2P collector module sends a request for peer location information to a tracker computer, the request for peer location information including the key, receives the requested information from the tracker computer, and uses the received information to establish at least one connection with the at least one remote peer to download at least the portion of the P2P content item.

13. The apparatus of claim 11, wherein the metadata key database module stores a plurality of info_hash values in accordance with the BitTorrent protocol, the plurality of info_hash values respectively corresponding to a plurality of P2P content items.

14. The apparatus of claim 11, wherein the content database module sends the downloaded portion of the P2P content item to the content acquisition and analysis system to enable subsequent identification of the P2P content item by the content identifier module.

15. The apparatus of claim 11, wherein the content identifier module maps a description of the P2P content item and the key to at least one recommended action for subsequent P2P content items detected to correspond to the same key.

16. The apparatus of claim 15, wherein the mapping between the description of the P2P content item and the key verifies whether advertised content is actually present in the P2P content item.

17. The apparatus of claim 11, wherein the P2P collector module repeatedly downloads a plurality of portions of the P2P content item until a sufficient section of the P2P content item is assembled to permit the content identifier module to accurately identify the P2P content item, and uses the content identifier module to determine a description of the P2P content item from the sufficient section of the P2P content item.

18. The apparatus of claim 17, wherein the content database module stores the sufficient section of the P2P content item, thereby permitting subsequent actions upon the sufficient section of the P2P content item, the subsequent actions comprising at least one of watermarking and fingerprinting.

19. The apparatus of claim 11, wherein the P2P collector module is a client crawler.

20. The apparatus of claim 11, wherein an Internet Service Provider (ISP) couples the content acquisition and analysis system to its network and uses the key uniquely identifying the P2P content item to monitor P2P traffic for subsequent occurrences of an identical key.

* * * * *